(12) United States Patent
Xu et al.

(10) Patent No.: US 12,443,983 B2
(45) Date of Patent: Oct. 14, 2025

(54) SYSTEMS AND METHODS FOR RECOMMENDATION SYSTEM ANALYSIS

(71) Applicant: Walmart Apollo, LLC, Bentonville, AR (US)

(72) Inventors: Da Xu, Sunnyvale, CA (US); Jianpeng Xu, San Jose, CA (US); Sushant Kumar, San Jose, CA (US); Evren Korpeoglu, San Jose, CA (US); Kannan Achan, Saratoga, CA (US)

(73) Assignee: WALMART APOLLO, LLC, Bentonville, AR (US)

( * ) Notice: Subject to any disclaimer, the term of this patent is extended or adjusted under 35 U.S.C. 154(b) by 478 days.

(21) Appl. No.: 17/581,635

(22) Filed: Jan. 21, 2022

(65) Prior Publication Data
US 2023/0267524 A1    Aug. 24, 2023

(51) Int. Cl.
*G06Q 30/0601*    (2023.01)
*G06F 9/50*    (2006.01)

(52) U.S. Cl.
CPC ......... *G06Q 30/0631* (2013.01); *G06F 9/505* (2013.01); *G06Q 30/0643* (2013.01)

(58) Field of Classification Search
CPC ..... G06Q 30/0631; G06Q 20/02; G06F 9/505
See application file for complete search history.

(56) References Cited

U.S. PATENT DOCUMENTS 7,949,659 B2    5/2011    Chakrabarti et al.
9,576,247 B2    2/2017    Balakrishnan et al.
(Continued)

OTHER PUBLICATIONS

Yan, Cairong, Two-Phased Multi-armed Bandit for Online Recommendation, Oct. 6, 2021, 2021 IEEE 8th International Conference on Data Science and Advanced Analytics (DSAA), pp. 1-8 (Year: 2021).*

*Primary Examiner* — Kelly S. Campen
*Assistant Examiner* — Timothy J Kang
(74) *Attorney, Agent, or Firm* — FOLEY & LARDNER LLP (57) ABSTRACT

Systems and methods including one or more processors and one or more non-transitory computer readable media storing computing instructions that, when executed on the one or more processors, cause the one or more processors to perform: receiving a user request via a graphical user interface, the user request corresponding to a user search query for a product; determining whether a first processing machine of the system is operating in a first processing mode or a second processing mode; when the first processing machine is determined to be operating in the first processing mode, analyzing the user request via the first processing machine and using a process, to identify a candidate recommendation system to utilize by: determining a randomized strategy for one or more candidate recommendation systems based on a ratio of a number of the one or more candidate recommender systems, the randomized strategy to be stored in a collected history data; determining model parameters based on the collected history data; and determining the candidate recommendation system from the one or more candidate recommendation systems as a candidate recommendation system with a maximum value for a reward model based on the user request; processing the user request with the candidate recommendation system to identify recommended products to display to the user; and transmitting instructions to modify the graphical user interface to display the recommended products to the user.

20 Claims, 5 Drawing Sheets

(56) References Cited

U.S. PATENT DOCUMENTS

| | | | |
|---|---|---|---|
| 10,636,073 B2 | 4/2020 | Zhu et al. | |
| 11,100,559 B2 | 8/2021 | Sesia et al. | |
| 2014/0089238 A1* | 3/2014 | Saito | G06F 16/68 |
| | | | 715/753 |
| 2016/0004966 A1* | 1/2016 | Flinn | G06N 5/022 |
| | | | 706/46 |
| 2016/0225063 A1* | 8/2016 | Wical | G06Q 30/0631 |
| 2017/0064363 A1* | 3/2017 | Wexler | H04L 67/306 |
| 2018/0025303 A1* | 1/2018 | Janz | G16H 50/20 |
| | | | 705/2 |
| 2018/0108048 A1* | 4/2018 | Yoon | G06Q 30/0271 |
| 2020/0074363 A1* | 3/2020 | Chan | H04L 41/5074 |
| 2021/0103945 A1 | 4/2021 | Montero et al. | |

* cited by examiner

SYSTEMS AND METHODS FOR RECOMMENDATION SYSTEM ANALYSIS

TECHNICAL FIELD

This disclosure relates generally to computing system management, and more particularly to systems and methods for recommendation system analysis.

BACKGROUND

Search engines are an integral part of most computing systems. Typically, a user inputs a query into a search engine and receives a number of recommended products. However, these recommended products may not be what the user was looking for. This results in the user inputting additional queries that can burden the computing system and frustrate the user. In some embodiments, a product recommendation system can be employed to provide recommended products to the user based on their search query. However, the results of the recommendation system may further frustrate the user and/or reduce an efficiency of the computing system.

BRIEF DESCRIPTION OF THE DRAWINGS

To facilitate further description of the embodiments, the following drawings are provided in which.

For simplicity and clarity of illustration, the drawing figures illustrate the general manner of construction, and descriptions and details of well-known features and techniques may be omitted to avoid unnecessarily obscuring the present disclosure. Additionally, elements in the drawing figures are not necessarily drawn to scale. For example, the dimensions of some of the elements in the figures may be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements may be electrically coupled together, but not be mechanically or otherwise coupled together. Coupling may be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "real-time" can, in some embodiments, be defined with respect to operations carried out as soon as practically possible upon occurrence of a triggering event. A triggering event can include receipt of data necessary to execute a task or to otherwise process information. Because of delays inherent in transmission and/or in computing speeds, the term "real time" encompasses operations that occur in "near" real time or somewhat delayed from a triggering event. In a number of embodiments, "real time" can mean real time less a time delay for processing (e.g., determining) and/or transmitting data. The particular time delay can vary depending on the type and/or amount of the data, the processing speeds of the hardware, the transmission capability of the communication hardware, the transmission distance, etc. However, in many embodiments, the time delay can be less than approximately one second, two seconds, five seconds, or ten seconds.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

A number of embodiments can include a system. The system can include one or more processors and one or more non-transitory computer-readable storage devices storing computing instructions. The computing instructions can be configured to run on the one or more processors and cause the one or more processors to perform: receiving a user request via a graphical user interface, the user request corresponding to a user search query for a product; determining whether a first processing machine of the system is operating in a first processing mode or a second processing mode; when the first processing machine is determined to be operating in the first processing mode, analyzing the user request via the first processing machine and using a process, to identify a candidate recommendation system to utilize by: determining a randomized strategy for one or more candidate recommendation systems based on a ratio of a number of the one or more candidate recommender systems, the randomized strategy to be stored in a collected history data; determining model parameters based on the collected history data; and determining the candidate recommendation system from the one or more candidate recommendation systems as a candidate recommendation system with a maximum value for a reward model based on the user request; processing the user request with the candidate recommendation system to identify recommended products to display to the user; and transmitting instructions to modify the graphical user interface to display the recommended products to the user.

Various embodiments include a method. The method can be implemented via execution of computing instructions configured to run at one or more processors and configured to be stored at non-transitory computer-readable media. The method can comprise receiving a user request via a graphical user interface, the user request corresponding to a user search query for a product; determining whether a first processing machine of the system is operating in a first processing mode or a second processing mode; when the first processing machine is determined to be operating in the first processing mode, analyzing the user request via the first processing machine and using a process, to identify a candidate recommendation system to utilize by: determining a randomized strategy for one or more candidate recommendation systems based on a ratio of a number of the one or more candidate recommender systems, the randomized strategy to be stored in a collected history data; determining model parameters based on the collected history data; and determining the candidate recommendation system from the one or more candidate recommendation systems as a candidate recommendation system with a maximum value for a reward model based on the user request; processing the user request with the candidate recommendation system to identify recommended products to display to the user; and transmitting instructions to modify the graphical user interface to display the recommended products to the user.

Selecting an optimal recommender system via A/B testing can be slow and costly, and offline evaluations are prone to the bias of history data. Accordingly, there is a need to determine an optimal online recommender system. While the problem can be formalized via the lens of multi-armed bandits, existing solutions are inadequate because the existing solutions do not account for the case-specific structures. Embodiments disclosed herein leverage a D-optimal design to achieve maximum information gain during exploration, which improves computing infrastructure of online inference.

Embodiments disclosed herein analyze several candidate recommenders that have shown comparable performances in offline evaluation. Embodiments disclosed herein utilize user (e.g., customer) features (e.g. user segmentation information) to minimize a cost and processing requirements of trying suboptimal recommenders on a customer group. In particular, embodiments disclosed herein are directed to an exploration-exploitation methodology to analyze recommendation systems and select the recommendation system that is most efficient for the overall system.

In embodiments disclosed herein, the exploration-exploitation strategy can be viewed as a sequential game between the developer and the customers. In each round $t=1, \ldots, n$, where the role of n will be made clear later, the developer chooses a recommender (e.g., a recommendation system) $a_t \in \{1, \ldots, k\}$ that produces the content, $c_t$ e.g. top-k recommendations, according to the front-end request $r_t$, e.g. customer id, user features, page type, etc. Then the customer reveals the reward $y_t$ such as click or not-click. The problem setting resembles that of the multi-armed bandits (MAB) by viewing each recommender as the action (arm). The front-end request $r_t$, together with the recommended content $c_t = a_t(x_t)$, can be thought of as the context. The context is informative of the reward because the clicking will depend on how well the content matches the request. A randomized experiment design can be characterized by a distribution $\pi$ over the candidate recommenders, i.e. $0 < \pi_t(\alpha) < 1$, $\Sigma_{i=1}^k \pi_t(i) = 1$ for $i=1, \ldots, n$. Embodiments disclosed herein utilize an optimal experimentation that can be converted to optimizing $\pi_t$, which is aligned with the bandit problems. The intuition is that by optimizing $\pi_t$, embodiments disclosed herein refine the estimation of the structures between context and reward, e.g. via supervised learning, at a low exploration cost and reduced system processing.

One concern of doing exploration is that irrelevant recommendations can severely harm user experience, which directly relates to gross merchandise volume (GMV). Therefore, embodiments disclosed herein leverage contextual structures and prior knowledge to further design systems and methods for higher efficiency. For example, suppose that there are six items in total, and the front-end request consists of a univariate user feature $r_t \in R$. The reward mechanism is given by the linear model:

$$Y_t = \theta_1 \cdot I_1 \times X_t + \ldots + \theta_6 \cdot I_6 \times X_t;$$

where $I_j$ is the indicator variable on whether item j is recommended. Consider the top-3 recommendation from four candidate recommendation systems $a_n(r_t)$ as follows (in the format of one-hot encoding):

$$a_1(r_t) = [1, 1, 1, 0, 0, 0]; \tag{1}$$
$$a_2(r_t) = [0, 0, 0, 1, 1, 1];$$
$$a_3(r_t) = [0, 0, 1, 0, 1, 1];$$
$$a_4(r_t) = [0, 0, 0, 1, 1, 1];$$

If each recommender is explored with the probability, the role of 1 is underrated since it is the only recommender that provides information about $\theta_1$ and $\theta_2$. Also, $a_2$ and $a_4$ give the same outputs, so their exploration probability should be discounted by half. Similarly, the information provided by $S_3$ can be recovered by $S_1$ and $S_4$ (or $S_2$) combined, so there is a linear dependency structure which embodiments disclosed herein leverage. Embodiments disclosed herein provide a setting for online recommendation system selection via exploration-exploitation, which provides efficiency to computing systems and provides an efficient infrastructure and implementation.

As used herein, lower and upper-case letters denote scalars and random variables, and bold-font lower and upper-case letters denote vectors and matrices. As used herein, [k] is a shorthand for the set of: $\{1, 2, \ldots, k\}$. A randomized experiment strategy (policy) is a mapping from the collected data to the recommendation systems, and maximizes the overall reward $$\sum_{t=1}^k Y_t.$$

The interactive process of the online recommendation system selection can be described as follows:
1. The developer receives a front-end request $r_t \sim P_{request}$.
2. The developer computes the feature representations that combines the request and outputs from all candidate recommender: $X_t := \{\phi(r_t, a_i(r_t))\}_{i=1}^k$
3. The developer chooses a recommender $a_t$ according to the randomized experiment strategy $\pi(a|X_t, \vec{h}_t)$.
4. The customer reveals the reward $y_t$.

In particular, the selected recommender at depends on the request, candidate outputs, as well as the history data:

$$a_t \sim \pi(a|r_t, \{\phi(r_t, a_i(r_t))\}_{i=1}^k, \vec{h}_t),$$

and the observation collected at each round is given by $$(r_t, \{\phi(r_t, a_i(r_t))\}_{i=1}^k, a_t, y_t).$$

Embodiments disclosed herein restrict computation complexity because online selection of a recommendation system is an additional layer on top of subsequent processing. Accordingly, the exploration-exploitation methods focus on the cumulative rewards:

$$Q(a) = \sum_{j=1}^{t} y_j 1[a=j]$$

and number of appearances: $N(a) = \sum_{j=1}^{t} 1[a=j]$ (assume up to round t) for $a=1, \ldots, k$, are computationally feasible, e.g. $\epsilon$-greedy: explores with probability $\epsilon$ under the uniform exploration policy $\pi(a)=1/k$, and selects arg $\max_{a \in [k]} Q(a)$, w otherwise (for exploitation); UCB: selects arg $\max_{a \in [k]} Q(a)+CI(a)$, where CI(a), where CI(a) characterizes the confidence interval of the action-specific reward Q(a), and is given by:

$$\sqrt{\log 1/\delta / N(a)}$$

for some pre-determined $\delta$.

Thompson sampling equips the sequential game with a Bayesian environment such that the developer: selects arg $\max_{a \in [k]} Q(a)$, where Q(a) is sampled from the posterior distribution Beta($\alpha_t, \beta_t$), and ($\alpha_t$ and $\beta_t$) and combines the prior knowledge of average reward and the actual observed rewards.

For Thompson sampling, the front-end computations can be simplified to calculating the univariate indices (Q, N, $\alpha$, $\beta$). For MAB, taking account of the context often requires employing a parametric reward model $y_a = f_\theta(\phi(r, a(r)))$ during exploration. Embodiments disclosed herein update the model parameters $\theta$ using the collected data. For example, considering an optimization oracle that returns $\theta$ by fitting the empirical observations, then all the above algorithms can be converted to the context-aware setting, e.g. epoch-greedy: explores under $\pi(a)=1/k$ for a epoch, and selects arg $\max_{a \in [k]} \hat{Y}_a := f_{\hat{\theta}}(\phi(r, a(r)))$, otherwise; LinUCB: by assuming the reward model is linear, it selects arg $\max_{a \in [k]} \hat{Y}_a = CI(a)$ where CI(a) characterizes the confidence of the linear model's estimation; Thompson sampling: samples $\hat{\theta}$ from the reward-model-specific posterior distribution of $\hat{\theta}$, and selects arg $\max_{a \in [k]} \hat{Y}_a$.

However, the optimization oracle involves expensive real-time computations, and is impractical for most online services. Therefore, embodiments disclosed herein utilize the stage-wise setting that divides exploration and exploitation. The design of $\pi$ thus becomes challenging with constantly updating $\hat{\theta}$. Therefore, embodiments disclosed herein utilize the structure of $f_\theta(\cdot)$.

Table 1 illustrates notation utilized in embodiments disclosed herein:

| | |
|---|---|
| k, m, n | The number of candidate actions (recommendation systems); the number of top recommendations; the number of exploration-exploitation rounds. |
| $R_t, A_t, Y_t$ | The frond-end request, action selected by the developer, and the reward at round. |
| $\vec{h}_t, \pi(\cdot|\cdot)$ | The history data collected until round t, and the strategy (policy) that maps the contexts and history data to a probability measure on the action space. |
| I, $a_i(\cdot)$ | The whole set of items and the $i^{th}$ candidate recommender, with $a_i(\cdot) \in I^{\otimes m}$. |
| $\phi(r_t, a_i(r_t))$ | The (engineered or pre-trained) feature representation in $\mathbb{R}^d$, specifically for the $t^{th}$-round front-end request and the output contents for the $i^{th}$ recommender. |

In embodiments disclosed herein, uppercase letters denote random variables, and the corresponding lowercase letters denote observations.

Figure 1:
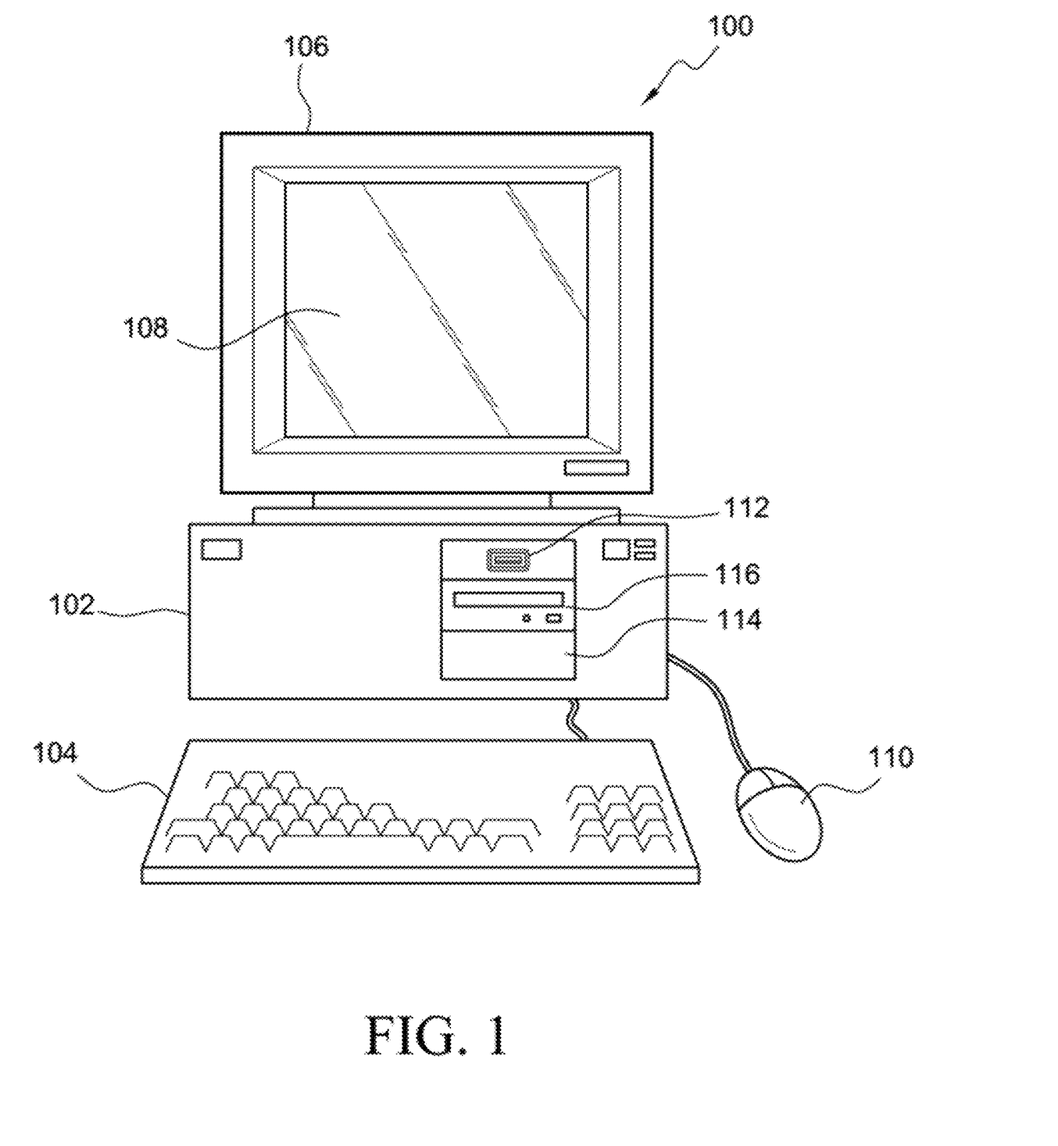
FIG. 1 illustrates a front elevational view of a computer system that is suitable for implementing various embodiments of the systems disclosed in FIG. 3.
Figure 2:
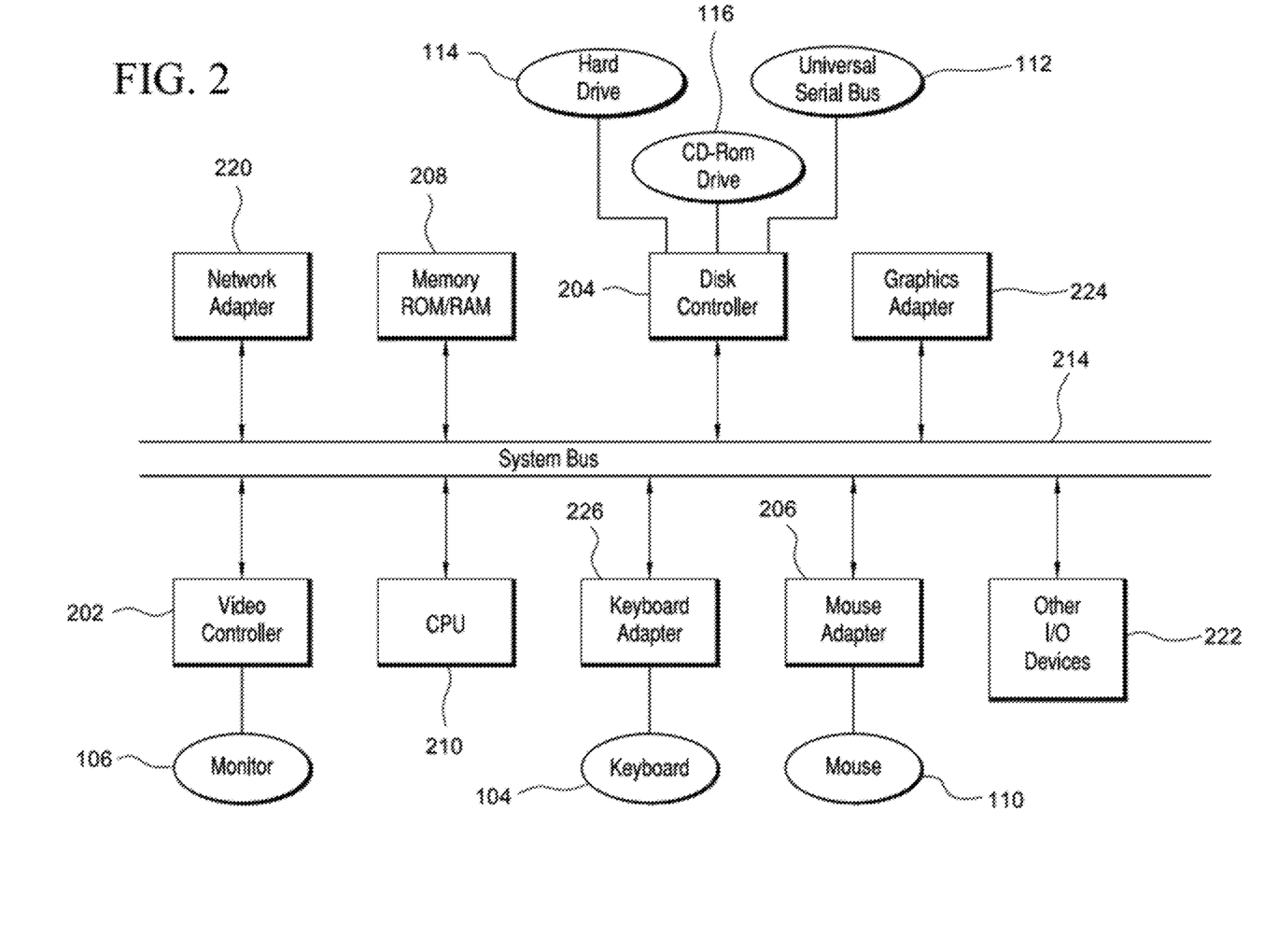
FIG. 2 illustrates a representative block diagram of an example of the elements included in the circuit boards inside a chassis of the computer system of FIG. 1.

Turning to the drawings, FIG. 1 illustrates an exemplary embodiment of a computer system 100, all of which or a portion of which can be suitable for (i) implementing part or all of one or more embodiments of the techniques, methods, and systems and/or (ii) implementing and/or operating part or all of one or more embodiments of the memory storage modules described herein. As an example, a different or separate one of a chassis 102 (and its internal components) can be suitable for implementing part or all of one or more embodiments of the techniques, methods, and/or systems described herein. Furthermore, one or more elements of computer system 100 (e.g., a monitor 106, a keyboard 104, and/or a mouse 110, etc.) also can be appropriate for implementing part or all of one or more embodiments of the techniques, methods, and/or systems described herein. Computer system 100 can comprise chassis 102 containing one or more circuit boards (not shown), a Universal Serial Bus (USB) port 112, a Compact Disc Read-Only Memory (CD-ROM) and/or Digital Video Disc (DVD) drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 can comprise (i) non-volatile memory, such as, for example, read only memory (ROM) and/or (ii) volatile memory, such as, for example, random access memory (RAM). The non-volatile memory can be removable and/or non-removable non-volatile memory. Meanwhile, RAM can include dynamic RAM (DRAM), static RAM (SRAM), etc. Further, ROM can include mask-programmed ROM, programmable ROM (PROM), one-time programmable ROM (OTP), erasable programmable read-only memory (EPROM), electrically erasable programmable ROM (EEPROM) (e.g., electrically alterable ROM (EAROM) and/or flash memory), etc. In these or other embodiments, memory storage unit 208 can comprise (i) non-transitory memory and/or (ii) transitory memory.

In many embodiments, all or a portion of memory storage unit 208 can be referred to as memory storage module(s) and/or memory storage device(s). In various examples, portions of the memory storage module(s) of the various embodiments disclosed herein (e.g., portions of the non-volatile memory storage module(s)) can be encoded with a boot code sequence suitable for restoring computer system 100 (FIG. 1) to a functional state after a system reset. In addition, portions of the memory storage module(s) of the various embodiments disclosed herein (e.g., portions of the non-volatile memory storage module(s)) can comprise microcode such as a Basic Input-Output System (BIOS) operable with computer system 100 (FIG. 1). In the same or different examples, portions of the memory storage module(s) of the various embodiments disclosed herein (e.g., portions of the non-volatile memory storage module(s)) can comprise an operating system, which can be a software program that manages the hardware and software resources of a computer and/or a computer network. The BIOS can initialize and test components of computer system 100 (FIG. 1) and load the operating system. Meanwhile, the operating system can perform basic tasks such as, for example, controlling and allocating memory, prioritizing the processing of instructions, controlling input and output devices, facilitating networking, and managing files. Exemplary operating systems can comprise one of the following: (i) Microsoft® Windows® operating system (OS) by Microsoft Corp. of Redmond, Washington, United States of America, (ii) Mac® OS X by Apple Inc. of Cupertino, California, United States of America, (iii) UNIX® OS, and (iv) Linux® OS. Further exemplary operating systems can comprise one of the following: (i) the iOS® operating system by Apple Inc. of Cupertino, California, United States of America, (ii) the Blackberry® operating system by Research In Motion (RIM) of Waterloo, Ontario, Canada, (iii) the WebOS operating system by LG Electronics of Seoul, South Korea, (iv) the Android™ operating system developed by Google, of Mountain View, California, United States of America, (v) the Windows Mobile™ operating system by Microsoft Corp. of Redmond, Washington, United States of America, or (vi) the Symbian™ operating system by Accenture PLC of Dublin, Ireland.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processing modules of the various embodiments disclosed herein can comprise CPU 210.

Alternatively, or in addition to, the systems and procedures described herein can be implemented in hardware, or a combination of hardware, software, and/or firmware. For example, one or more application specific integrated circuits (ASICs) can be programmed to carry out one or more of the systems and procedures described herein. For example, one or more of the programs and/or executable program components described herein can be implemented in one or more ASICs. In many embodiments, an application specific integrated circuit (ASIC) can comprise one or more processors or microprocessors and/or memory blocks or memory storage.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

Network adapter 220 can be suitable to connect computer system 100 (FIG. 1) to a computer network by wired communication (e.g., a wired network adapter) and/or wireless communication (e.g., a wireless network adapter). In some embodiments, network adapter 220 can be plugged or coupled to an expansion port (not shown) in computer system 100 (FIG. 1). In other embodiments, network adapter 220 can be built into computer system 100 (FIG. 1). For example, network adapter 220 can be built into computer system 100 (FIG. 1) by being integrated into the motherboard chipset (not shown), or implemented via one or more dedicated communication chips (not shown), connected through a PCI (peripheral component interconnector) or a PCI express bus of computer system 100 (FIG. 1) or USB port 112 (FIG. 1).

Returning now to FIG. 1, although many other components of computer system 100 are not shown, such components and their interconnection are well known to those of ordinary skill in the art. Accordingly, further details concerning the construction and composition of computer system 100 and the circuit boards inside chassis 102 are not discussed herein.

Meanwhile, when computer system 100 is running, program instructions (e.g., computer instructions) stored on one or more of the memory storage module(s) of the various embodiments disclosed herein can be executed by CPU 210 (FIG. 2). At least a portion of the program instructions, stored on these devices, can be suitable for carrying out at least part of the techniques and methods described herein.

Further, although computer system 100 is illustrated as a desktop computer in FIG. 1, there can be examples where computer system 100 may take a different form factor while still having functional elements similar to those described for computer system 100. In some embodiments, computer system 100 may comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 may comprise a portable computer, such as a laptop computer. In certain other embodiments, computer system 100 may comprise a mobile electronic device, such as a smartphone. In certain additional embodiments, computer system 100 may comprise an embedded system.

Figure 3:
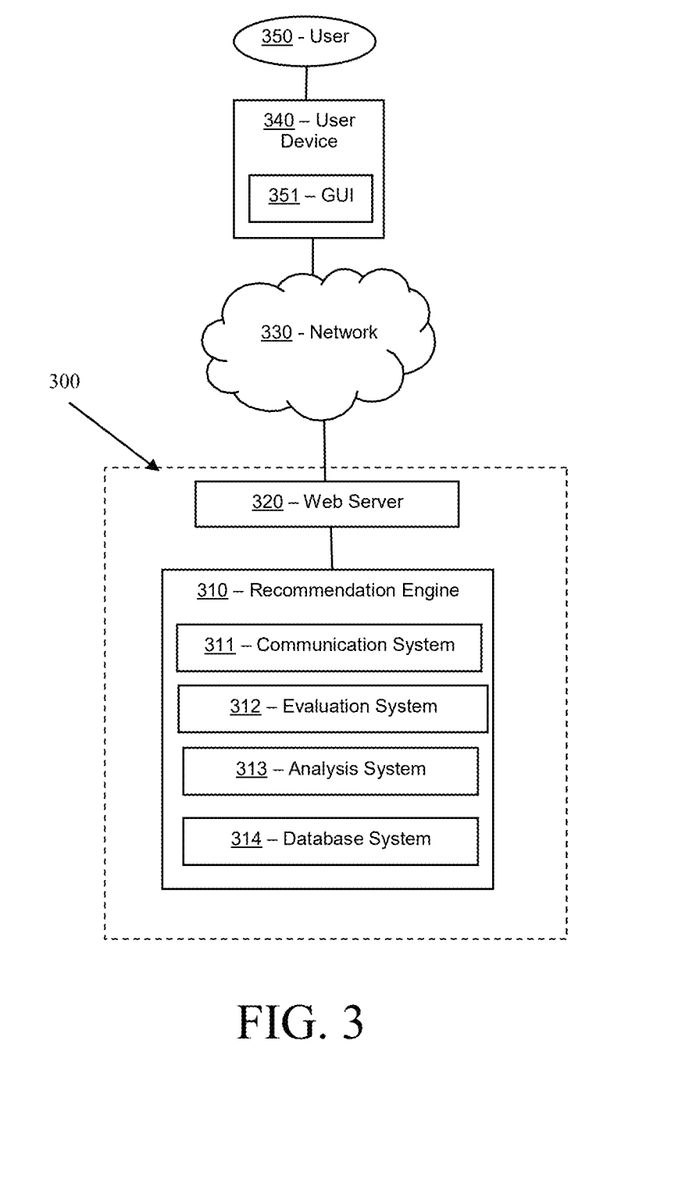
FIG. 3 illustrates a representative block diagram of a system, according to an embodiment.

Turning ahead in the drawings, FIG. 3 illustrates a block diagram of a system 300 that can be employed for determining and analyzing query suggestions and one or more query suggestion systems, according to an embodiment. System 300 is merely exemplary and embodiments of the system are not limited to the embodiments presented herein. The system can be employed in many different embodiments or examples not specifically depicted or described herein. In some embodiments, certain elements, modules, or systems of system 300 can perform various procedures, processes, and/or activities. In other embodiments, the procedures, processes, and/or activities can be performed by other suitable elements, modules, or systems of system 300. In some embodiments, system 300 can include a recommendation engine 310 and/or web server 320.

Generally, therefore, system 300 can be implemented with hardware and/or software, as described herein. In some embodiments, part or all of the hardware and/or software can be conventional, while in these or other embodiments, part or all of the hardware and/or software can be customized (e.g., optimized) for implementing part or all of the functionality of system 300 described herein.

Recommendation engine 310 and/or web server 320 can each be a computer system, such as computer system 100 (FIG. 1), as described above, and can each be a single computer, a single server, or a cluster or collection of computers or servers, or a cloud of computers or servers. In another embodiment, a single computer system can host recommendation engine 310 and/or web server 320. Additional details regarding recommendation engine 310 and/or web server 320 are described herein.

In some embodiments, web server 320 can be in data communication through a network 330 with one or more user devices, such as a user device 340, which also can be part of system 300 in various embodiments. User device 340 can be part of system 300 or external to system 300. Network 330 can be the Internet or another suitable network. In some embodiments, user device 340 can be used by users, such as a user 350. In many embodiments, web server 320 can host one or more websites and/or mobile application servers. For example, web server 320 can host a website, or provide a server that interfaces with an application (e.g., a mobile application), on user device 340, which can allow users (e.g., 350) to interact with infrastructure components in an IT environment, in addition to other suitable activities. In a number of embodiments, web server 320 can interface with recommendation engine 310 when a user (e.g., 350) is viewing infrastructure components in order to assist with the analysis of the infrastructure components.

In some embodiments, an internal network that is not open to the public can be used for communications between recommendation engine 310 and web server 320 within system 300. Accordingly, in some embodiments, recommendation engine 310 (and/or the software used by such systems) can refer to a back end of system 300 operated by an operator and/or administrator of system 300, and web server 320 (and/or the software used by such systems) can refer to a front end of system 300, as is can be accessed and/or used by one or more users, such as user 350, using user device 340. In these or other embodiments, the operator and/or administrator of system 300 can manage system 300, the processor(s) of system 300, and/or the memory storage unit(s) of system 300 using the input device(s) and/or display device(s) of system 300.

In certain embodiments, the user devices (e.g., user device 340) can be desktop computers, laptop computers, mobile devices, and/or other endpoint devices used by one or more users (e.g., user 350). A mobile device can refer to a portable electronic device (e.g., an electronic device easily conveyable by hand by a person of average size) with the capability to present audio and/or visual data (e.g., text, images, videos, music, etc.). For example, a mobile device can include at least one of a digital media player, a cellular telephone (e.g., a smartphone), a personal digital assistant, a handheld digital computer device (e.g., a tablet personal computer device), a laptop computer device (e.g., a notebook computer device, a netbook computer device), a wearable user computer device, or another portable computer device with the capability to present audio and/or visual data (e.g., images, videos, music, etc.). Thus, in many examples, a mobile device can include a volume and/or weight sufficiently small as to permit the mobile device to be easily conveyable by hand. For examples, in some embodiments, a mobile device can occupy a volume of less than or equal to approximately 1790 cubic centimeters, 2434 cubic centimeters, 2876 cubic centimeters, 4056 cubic centimeters, and/or 5752 cubic centimeters. Further, in these embodiments, a mobile device can weigh less than or equal to 15.6 Newtons, 17.8 Newtons, 22.3 Newtons, 31.2 Newtons, and/or 44.5 Newtons.

Further still, the term "wearable user computer device" as used herein can refer to an electronic device with the capability to present audio and/or visual data (e.g., text, images, videos, music, etc.) that is configured to be worn by a user and/or mountable (e.g., fixed) on the user of the wearable user computer device (e.g., sometimes under or over clothing; and/or sometimes integrated with and/or as clothing and/or another accessory, such as, for example, a hat, eyeglasses, a wrist watch, shoes, etc.). In many examples, a wearable user computer device can comprise a mobile electronic device, and vice versa. However, a wearable user computer device does not necessarily comprise a mobile electronic device, and vice versa.

In specific examples, a wearable user computer device can comprise a head mountable wearable user computer device (e.g., one or more head mountable displays, one or more eyeglasses, one or more contact lenses, one or more retinal displays, etc.) or a limb mountable wearable user computer device (e.g., a smart watch). In these examples, a head mountable wearable user computer device can be mountable in close proximity to one or both eyes of a user of the head mountable wearable user computer device and/or vectored in alignment with a field of view of the user.

In more specific examples, a head mountable wearable user computer device can comprise (i) Google Glass™ product or a similar product by Google Inc. of Menlo Park, California, United States of America; (ii) the Eye Tap™ product, the Laser Eye Tap™ product, or a similar product by ePI Lab of Toronto, Ontario, Canada, and/or (iii) the Raptyr™ product, the STAR 1200™ product, the Vuzix Smart Glasses M100™ product, or a similar product by Vuzix Corporation of Rochester, New York, United States of America. In other specific examples, a head mountable wearable user computer device can comprise the Virtual Retinal Display™ product, or similar product by the University of Washington of Seattle, Washington, United States of America. Meanwhile, in further specific examples, a limb mountable wearable user computer device can comprise the iWatch™ product, or similar product by Apple Inc. of Cupertino, California, United States of America, the Galaxy Gear or similar product of Samsung Group of Samsung Town, Seoul, South Korea, the Moto 360 product or similar product of Motorola of Schaumburg, Illinois, United States of America, and/or the Zip™ product, One™ product, Flex™ product, Charge™ product, Surge™ product, or similar product by Fitbit Inc. of San Francisco, California, United States of America.

Exemplary mobile devices can include (i) an iPod®, iPhone®, iTouch®, iPad®, MacBook® or similar product by Apple Inc. of Cupertino, California, United States of America, (ii) a Blackberry® or similar product by Research in Motion (RIM) of Waterloo, Ontario, Canada, (iii) a Lumia® or similar product by the Nokia Corporation of Keilaniemi, Espoo, Finland, and/or (iv) a Galaxy™ or similar product by the Samsung Group of Samsung Town, Seoul, South Korea. Further, in the same or different embodiments, a mobile device can include an electronic device configured to implement one or more of (i) the iPhone® operating system by Apple Inc. of Cupertino, California, United States of America, (ii) the Blackberry® operating system by Research In Motion (RIM) of Waterloo, Ontario, Canada, (iii) the Android™ operating system developed by the Open Handset Alliance, or (iv) the Windows Mobile™ operating system by Microsoft Corp. of Redmond, Washington, United States of America.

In many embodiments, recommendation engine 310 and/or web server 320 can each include one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to recommendation engine 310 and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processor(s) and/or the memory storage unit(s). In some embodiments, the KVM switch also can be part of recommendation engine 310 and/or web server 320. In a similar manner, the processors and/or the non-transitory computer-readable media can be local and/or remote to each other.

Meanwhile, in many embodiments, recommendation engine 310 and/or web server 320 also can be configured to communicate with one or more databases, such as a database system 314. The one or more databases can include query suggestion information, user activity information, and/or machine learning training data, for example, among other data as described herein. The one or more databases can be stored on one or more memory storage units (e.g., non-transitory computer readable media), which can be similar or identical to the one or more memory storage units (e.g., non-transitory computer readable media) described above with respect to computer system 100 (FIG. 1). Also, in some embodiments, for any particular database of the one or more databases, that particular database can be stored on a single memory storage unit or the contents of that particular database can be spread across multiple ones of the memory storage units storing the one or more databases, depending on the size of the particular database and/or the storage capacity of the memory storage units.

The one or more databases can each include a structured (e.g., indexed) collection of data and can be managed by any suitable database management systems configured to define, create, query, organize, update, and manage database(s). Exemplary database management systems can include MySQL (Structured Query Language) Database, PostgreSQL Database, Microsoft SQL Server Database, Oracle Database, SAP (Systems, Applications, & Products) Database, and IBM DB2 Database.

Meanwhile, recommendation engine 310, web server 320, and/or the one or more databases can be implemented using any suitable manner of wired and/or wireless communication. Accordingly, system 300 can include any software and/or hardware components configured to implement the wired and/or wireless communication. Further, the wired and/or wireless communication can be implemented using any one or any combination of wired and/or wireless communication network topologies (e.g., ring, line, tree, bus, mesh, star, daisy chain, hybrid, etc.) and/or protocols (e.g., personal area network (PAN) protocol(s), local area network (LAN) protocol(s), wide area network (WAN) protocol(s), cellular network protocol(s), powerline network protocol(s), etc.). Exemplary PAN protocol(s) can include Bluetooth, Zigbee, Wireless Universal Serial Bus (USB), Z-Wave, etc.; exemplary LAN and/or WAN protocol(s) can include Institute of Electrical and Electronic Engineers (IEEE) 802.3 (also known as Ethernet), IEEE 802.11 (also known as WiFi), etc.; and exemplary wireless cellular network protocol(s) can include Global System for Mobile Communications (GSM), General Packet Radio Service (GPRS), Code Division Multiple Access (CDMA), Evolution-Data Optimized (EV-DO), Enhanced Data Rates for GSM Evolution (EDGE), Universal Mobile Telecommunications System (UMTS), Digital Enhanced Cordless Telecommunications (DECT), Digital AMPS (IS-136/Time Division Multiple Access (TDMA)), Integrated Digital Enhanced Network (iDEN), Evolved High-Speed Packet Access (HSPA+), Long-Term Evolution (LTE), WiMAX, etc. The specific communication software and/or hardware implemented can depend on the network topologies and/or protocols implemented, and vice versa. In many embodiments, exemplary communication hardware can include wired communication hardware including, for example, one or more data buses, such as, for example, universal serial bus(es), one or more networking cables, such as, for example, coaxial cable(s), optical fiber cable(s), and/or twisted pair cable(s), any other suitable data cable, etc. Further exemplary communication hardware can include wireless communication hardware including, for example, one or more radio transceivers, one or more infrared transceivers, etc. Additional exemplary communication hardware can include one or more networking components (e.g., modulator-demodulator components, gateway components, etc.).

In many embodiments, recommendation engine 310 can include a communication system 311, an evaluation system 312, an analysis system 313, and/or database system 314. In many embodiments, the systems of recommendation engine 310 can be modules of computing instructions (e.g., software modules) stored at non-transitory computer readable media that operate on one or more processors. In other embodiments, the systems of recommendation engine 310 can be implemented in hardware. Recommendation engine 310 and/or web server 320 each can be a computer system, such as computer system 100 (FIG. 1), as described above, and can be a single computer, a single server, or a cluster or collection of computers or servers, or a cloud of computers or servers. In another embodiment, a single computer system can host recommendation engine 310 and/or web server 320. Additional details regarding recommendation engine 310 and the components thereof are described herein.

In many embodiments, user device 340 can comprise graphical user interface ("GUI") 351. In the same or different embodiments, GUI 351 can be part of and/or displayed by user computer 340, which also can be part of system 300. In some embodiments, GUI 351 can comprise text and/or graphics (image) based user interfaces. In the same or different embodiments, GUI 351 can comprise a heads up display ("HUD"). When GUI 351 comprises a HUD, GUI 351 can be projected onto a medium (e.g., glass, plastic, etc.), displayed in midair as a hologram, or displayed on a display (e.g., monitor 106 (FIG. 1)). In various embodiments, GUI 351 can be color, black and white, and/or greyscale. In many embodiments, GUI 351 can comprise an application running on a computer system, such as computer system 100 (FIG. 1), user computers 340. In the same or different embodiments, GUI 351 can comprise a website accessed through internet 320. In some embodiments, GUI 351 can comprise an eCommerce website. In these or other embodiments, GUI 351 can comprise an administrative (e.g., back end) GUI allowing an administrator to modify and/or change one or more settings in system 300. In the same or different embodiments, GUI 351 can be displayed as or on a virtual reality (VR) and/or augmented reality (AR) system or display. In some embodiments, an interaction with a GUI can comprise a click, a look, a selection, a grab, a view, a purchase, a bid, a swipe, a pinch, a reverse pinch, etc.

In some embodiments, web server 320 can be in data communication through network (e.g., Internet) 330 with user computers (e.g., 340). In certain embodiments, user computers 340 can be desktop computers, laptop computers, smart phones, tablet devices, and/or other endpoint devices. Web server 320 can host one or more websites. For example, web server 320 can host an eCommerce website that allows users to browse and/or search for products, to add products to an electronic shopping cart, and/or to purchase products, in addition to other suitable activities.

In many embodiments, recommendation engine 310, and/or web server 320 can each comprise one or more input devices (e.g., one or more keyboards, one or more keypads, one or more pointing devices such as a computer mouse or computer mice, one or more touchscreen displays, a microphone, etc.), and/or can each comprise one or more display devices (e.g., one or more monitors, one or more touch screen displays, projectors, etc.). In these or other embodiments, one or more of the input device(s) can be similar or identical to keyboard 104 (FIG. 1) and/or a mouse 110 (FIG. 1). Further, one or more of the display device(s) can be similar or identical to monitor 106 (FIG. 1) and/or screen 108 (FIG. 1). The input device(s) and the display device(s) can be coupled to the processing module(s) and/or the memory storage module(s) of recommendation engine 310, and/or web server 320 in a wired manner and/or a wireless manner, and the coupling can be direct and/or indirect, as well as locally and/or remotely. As an example of an indirect manner (which may or may not also be a remote manner), a keyboard-video-mouse (KVM) switch can be used to couple the input device(s) and the display device(s) to the processing module(s) and/or the memory storage module(s). In some embodiments, the KVM switch also can be part of recommendation engine 310, and/or web server 320. In a similar manner, the processing module(s) and the memory storage module(s) can be local and/or remote to each other.

In many embodiments, recommendation engine 310, and/or web server 320 can be configured to communicate with one or more user computers 340. In some embodiments, user computers 340 also can be referred to as customer computers. In some embodiments, recommendation engine 310, and/or web server 320 can communicate or interface (e.g., interact) with one or more customer computers (such as user computers 340) through a network or internet 330. Internet 330 can be an intranet that is not open to the public. In further embodiments, Internet 330 can be a mesh network of individual systems. Accordingly, in many embodiments, recommendation engine 310, and/or web server 320 (and/or the software used by such systems) can refer to a back end of system 300 operated by an operator and/or administrator of system 300, and user computers 340 (and/or the software used by such systems) can refer to a front end of system 300 used by one or more users 350, respectively. In some embodiments, users 350 can also be referred to as customers, in which case, user computers 340 can be referred to as customer computers. In these or other embodiments, the operator and/or administrator of system 300 can manage system 300, the processing module(s) of system 300, and/or the memory storage module(s) of system 300 using the input device(s) and/or display device(s) of system 300.

Figure 4:
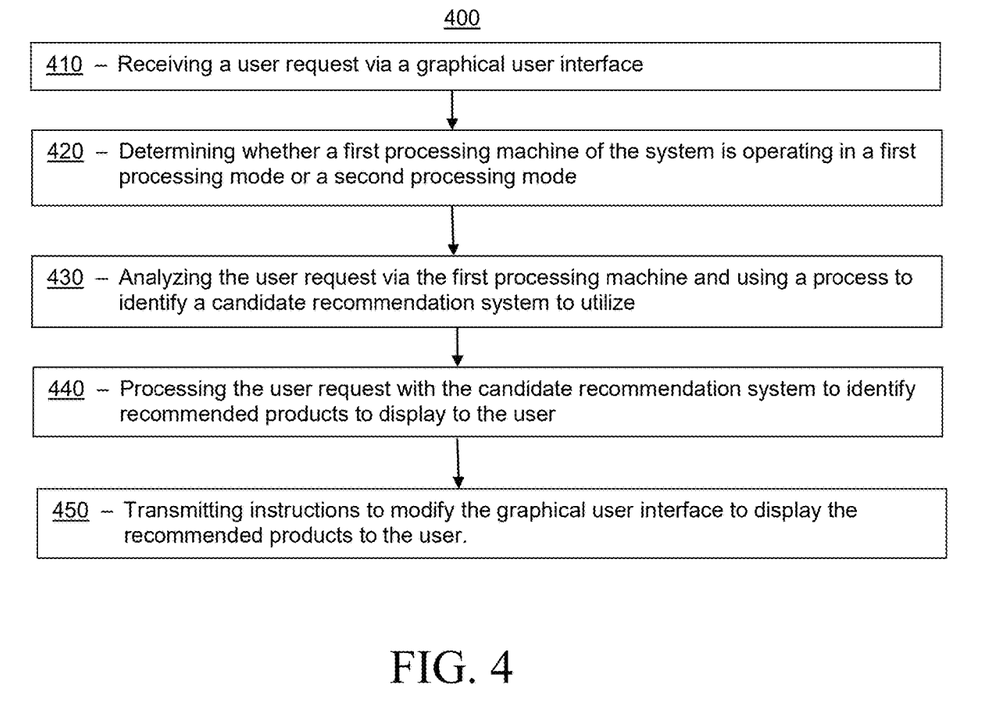
FIG. 4 illustrates a flowchart for a method, according to certain embodiments.

Turning ahead in the drawings, FIG. 4 illustrates a flow chart for a method 400, according to an embodiment. Method 400 is merely exemplary and is not limited to the embodiments presented herein. Method 400 can be employed in many different embodiments or examples not specifically depicted or described herein. In some embodiments, the activities of method 400 can be performed in the order presented. In other embodiments, the activities of method 400 can be performed in any suitable order. In still other embodiments, one or more of the activities of method 400 can be combined or skipped. In many embodiments, system 300 (FIG. 3) can be suitable to perform method 400 and/or one or more of the activities of method 400. In these or other embodiments, one or more of the activities of method 400 can be implemented as one or more computer instructions configured to run at one or more processing modules and configured to be stored at one or more non-transitory memory storage modules. Such non-transitory memory storage modules can be part of a computer system such as recommendation engine 310, web server 320, and/or user device 340 (FIG. 3). The processing module(s) can be similar or identical to the processing module(s) described above with respect to computer system 100 (FIG. 1).

In many embodiments, method 400 can comprise an activity 410 of receiving a user request via a graphical user interface. In some embodiments, the user request corresponds to a user search query for a product. For example, a user request (e.g., a front end request) such as "television" can be input into a GUI of a website.

Figure 5:
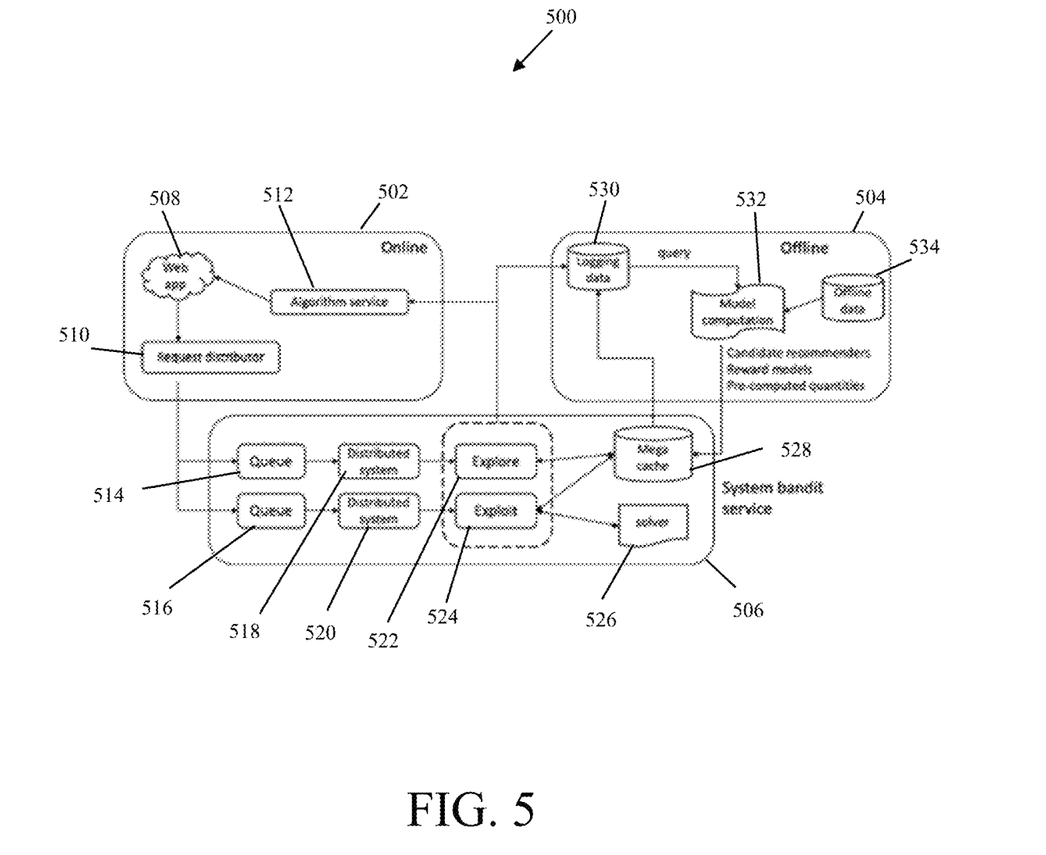
FIG. 5 illustrates an exemplary system architecture, according to certain embodiments.

Turning briefly to FIG. 5, an exemplary system architecture 500 is illustrated. The system architecture 500 comprises an online component 502, an offline component 504, and a system bandit service 506. The online component 502 comprises a web application 508, a request distributor 510, and an algorithm service 512. In the illustrated example, a user can access the web application 508 and input a search query. For example, the web application 508 can be an ecommerce web application and the user can input a search query for "television."

Returning to FIG. 4, in many embodiments, method 400 can comprise an activity 420 of determining whether a first processing machine of the system is operating in a first processing mode or a second processing mode. Turning to FIG. 5, the request distributor 510 determines whether the first processing machine of the system is operating in the first processing mode or the second processing mode. In particular, the request distributor 510 determines if the system bandit service 506 is operating in the first processing mode or the second processing mode. The system bandit service 506 of the illustrated example of FIG. 5 comprises a first queue 514, a second queue 516, a first distributed system 518, a second distributed system 520, an explore module 522, an exploit module 524, a solver 526, and a mega cache 528.

In some embodiments, the request distributor 510 determines which of the first queue 514 or the second queue 516 has a shorter queue. That is, the request distributor 510 determines which of the first queue 514 or the second queue 516 has more memory for storing user search queries. When the request distributor 510 determines that the first queue 514 has the shorter queue, the request distributor 510 transmits the user requests to the first queue 514.

In some embodiments, the first distributed system 518 and the second distributed system 520 manage how the user requests from the first queue 514 or the second queue 516 are processed by the system bandit service 506. In some embodiments, the first distributed system 518 and the second distributed system 520 determine if the system bandit service 506 is operating in a first processing mode or a second processing mode. In some embodiments, the first processing mode is a low processing mode, and a second processing mode is a high processing mode consuming more computing resources than the low processing mode; thus, the process comprises an exploit process. In such an embodiment, the first distributed system 518 or the second distributed system 520 would transmit the user requests to the exploit module 524. In other embodiments, the first processing mode is a high processing mode, and the second processing mode is a low processing mode consuming more computing resources than the high processing mode; thus, the process comprises an explore process. In such an embodiment, the first distributed system 518 or the second distributed system 520 would transmit the user requests to the explore module 522. In some embodiments, the exploit process further comprises resetting the collected history data collected prior to determining the randomized strategy, as discussed in more detail in connection with algorithm 1.

Returning to FIG. 4, in many embodiments, method 400 can comprise an activity 430 of analyzing the user request via the first processing machine and using a process to identify a candidate recommendation system to utilize.

In some embodiments, when the first processing machine is determined to be operating in the low processing mode, the solver 526 (FIG. 5) analyzes the user request via the first processing machine and using a process, to identify a candidate recommendation system to utilize by executing algorithm 1 as follows:

---
Algorithm 1: Stage-wise exploration and exploitation
---

Input: Reward model $f_\theta(\cdot)$; the restart criteria; the initialized history data $h_{r_t}$
1  while total rounds ≤ n do
2  | if restart criteria is satisfied then
3  | | Reset $h_{r_t}$;
4  | End
5  | Play $n_1$ rounds of random exploration, for instance: $\pi(a|\cdot) = \frac{1}{k}$,
   | and collect observation to $h_{r_t}$;

---
Algorithm 1: Stage-wise exploration and exploitation
---

6  | Find the optimal $\hat{\theta}$ based on $h_{r_t}$;
   | (e.. via empirical-risk minimization);
7  | Play $n_2$ rounds of exploitation with:

| $a_t = \arg \max_a f_{\hat{\theta}}(r_t, a(r_t))$;

8  End

---

Turning to FIG. 5, the solver 526 stores and executes algorithm 1. In some embodiments, the solver 526 determines a randomized strategy π for one or more candidate recommendation systems based on a ratio of a number of the one or more candidate recommender systems in step 5. In some embodiments, the randomized strategy to be stored in a collected history data. In some embodiments, the solver 526 determines model parameters based on the collected history data in step 6. In some embodiments, the solver 526 determines the candidate recommendation system from the one or more candidate recommendation systems as a candidate recommendation system with a maximum value for a reward model based on the user request in step 7 during the exploitation process. In some embodiments, the solver 526 determines the model parameters based on the collected history data by performing empirical-risk minimization.

Algorithm 1 is computationally efficient because Step 5 involves front-end and cache operations, Step 6 is a batch-wise training on the back-end, and Step 7 applies to the standard front-end inference. As such, algorithm 1 requires little modification from the existing infrastructure that supports model inference. Additional advantages of algorithm 1 include: (i) the number of exploration and exploitation rounds, which decides the proportion of traffic for each task, can be adaptively adjusted by the resource availability and response time service level agreements; and (ii) the non-stationary environment, which are often detected via the hypothesis testing methods can be handled by setting the restart criteria accordingly.

Embodiments disclosed herein leverage case-specific structures to minimize the number of exploration steps it may take to collect equal information for estimating θ in step 5 of algorithm 1. In some embodiments, the reward model has one of the following forms:

$$y_t = \begin{cases} \theta^T(\phi(r_t, a(r_t))), & \text{linear model} \\ f_\theta(\phi(r_t, a(r_t))), & \text{for some nonlinear } f_\theta(\cdot), \end{cases} \quad (2)$$

In each round t, embodiments disclosed herein find an optimal design $\pi(\cdot|\cdot)$ such that the action sampled from leads to a maximum information for estimating θ. The Fisher information is a quantity for evaluating the amount of information in the observations. For the general $f_\theta$, the Fisher information under (2) is given by:

$$M(\pi) = \sum_{a_i=1}^{k} \pi(a_i) \pi(a_i) \nabla_\theta f_\theta(\phi(r_t, a_i(r_t))) \cdot \nabla_\theta f_\theta(\phi(r_t, a_i(r_t)))^T, \quad (3)$$

where $\pi(a_i)$ is a shorthand for the designed policy. For the linear reward model, the Fisher information is simplified to:

$$M(\pi) = \sum_{a_i=1}^{k} \pi(a_i) \phi(r_t, a_i(r_t)) \cdot \phi(r_t, a_i(r_t))^T \quad (4)$$

where: $Var(\hat{\theta}) \propto M(\pi)^{-1}$; the prediction variance for $\phi_i := (r_t, a_i(r_t))$ is given by $var(\hat{y}_i) \propto \phi_i M(\pi)^{-1} \phi_i^T$.

Accordingly, an optimal online experiment design can be explained as minimizing the uncertainty in the reward model, either for parameter estimation or prediction. In some embodiments, a D-optimal design minimizes $|M(\pi)^{-1}|$ from the perspective of estimation variance, and the G-optimal design minimize $\max_{i \in \{1, \ldots, k\}} \phi_i M(\pi)^{-1} \phi_i^T$ from the perspective of prediction variance. As used herein, the following are equivalent: $\pi^* = \max_\pi \log \det|M(\pi)|$; $\pi^*$ is D-optimal; and $\pi^*$ is G-optimal.

In some embodiments, convex optimization can be utilized to determine the optimal design for both parameter estimation and prediction:

$$\max_\pi \log \det|M_{(\pi)}| \text{ s.t. } \sum_{a_i=1}^{k} \pi(a_i) = 1$$

Embodiments disclosed herein determine the linear reward setting, and the prior for $\theta$ is given by $0 \sim N(0, R)$ where $R$ is the covariance matrix. In some embodiments, the Bayesian design focus is on the design optimality in terms of certain utility function $U(\pi)$. In some embodiments, y can be the hypothetical rewards for $\phi(r_t, a_1(r_t)), \ldots, \phi(r_t, a_k(r_t))$. The gain in Shannon information is given by:

$$U(\pi) = \int \log p(\theta|y, \pi) p(y, \theta|\pi) d\theta dy = C + \frac{1}{2} \log \det \left| M(\pi) + R^{-1} \right|, \quad (5)$$

where C is a constant. Therefore, maximizing $U(\pi)$ is equivalent to maximizing $\log \det|M(\pi) + R^{-1}|$.

Thus, there is now an additive R term inside the determinant. In such an embodiment, R is the covariance of the prior, so given the previous history data, embodiments disclosed herein utilize the empirical estimation of R. In particular, let $\vec{\phi}$ be the collection of feature vectors from the previous exploration rounds: $[\phi(x_1, a_1(x_1)), \ldots, \phi(x_{t-1}, a_{t-1}(x_{t-1}))]$. Then R is determined by: $(\vec{\phi}_{t-1} \vec{\phi}_{t-1}^T)^{-1}$. Therefore, the objective for Bayesian optimal design, after integrating the prior from the history data, is given by:

$$\text{maximize}_\pi \log \det \left| M(\pi) + \lambda \phi_{t-1} \phi_{t-1}^T \right|, \text{ s.t. } \sum_{a_i=1}^{k} \pi(a_i) = 1, \quad (6)$$

where the hyper parameter $\lambda$ controls influence of the history data.

In some embodiments, $\nabla_\theta f_\theta(\phi(r_t, a(r_t)))$ now depends on $\theta$, so the Fisher information in equation (4) is also a function of the unknown $\theta$. Embodiments disclosed herein utilize a local linearization of $f_\theta(\cdot)$ using the Taylor expansion:

$$f_\theta(\phi(r_t, a(r_t))) \approx f_{\theta_0}(\phi(r_t, a(r_t))) + \nabla_\theta f_\theta(r_t, a(r_t))|_{\theta=\theta_0}(\theta-\theta_0), \quad (7)$$

where $\theta_0$ is some local approximation. Reformulating produces the following equation:

$$\nabla_\theta f_\theta \approx \nabla_\theta f_\theta(\phi(r_t, a(r_t)))|_{\theta=\theta_0}, \quad (8)$$

and the local Fisher information will be given by $M(\pi; \theta_0)$ according to equation (4). The effectiveness of local linearization depends on the choice of $\theta_0$. Embodiments disclosed herein utilize $\theta_0$ to obtain the optimal designs for the following exploration rounds:

$$\text{maximize}_\pi \log \det |M(\pi); \theta_0| \text{s.t.} \sum_{a_i=1}^{k} \pi(a_i) = 1. \quad (9)$$

Returning to FIG. 4, in many embodiments, method 400 can comprise an activity 440 of processing the user request with the candidate recommendation system to identify recommended products to display to the user. Turning to FIG. 5, the offline component 504 comprises logging data 530, model computation 532, and offline data 534. In some embodiments, the solver 526 analyzes user requests based on user requests received from either the explore module 522 or the exploit module 524 based on the processing mode the system bandit service 506 is currently operating. In the illustrated embodiment, the solver transmits the processed user requests to the mega cache 528, which transmits the user requests to the offline component 504, which processes the user requests offline. In some embodiments, the model computation 532 analyzes the user requests using one or more candidate recommendation systems. For example, the model computation 532 analyzes the user requests and outputs recommendation results based on the output from each of the one or more recommendation systems. In some embodiments, the model computation 532 outputs the results from the candidate recommendation systems, rewards models and pre-computed quantities to the mega cache 528. In some embodiments, the mega cache 528 transmits the candidate recommendation system to the solver 526 and the solver 526 processes the user requests using the candidate recommendation system and transmits the recommended products to the algorithm service 512.

In some embodiments, determining the randomized strategy comprises using algorithm 2 as follows:

---

Algorithm 2: The optimal design solver

---

Input: A subroutine for computing the $M(\pi; \theta_0)$ in (4) or (8); the estimation $\theta_0 = \hat{\theta}$ and $\eta_a := \nabla_\theta f_\theta(\phi(r_t, a(r_t)))|_{\theta=\theta_0}$; the convergence criteria.

1    Initialize $\pi^{old}$: $\pi^{old}(a) = \frac{1}{k}, a = 1, \ldots, k$;

2    while convergence criteria not met do
3    | find $\tilde{a} = \text{argmax}_a \eta_a^T M(\theta^{old}; \theta_0)^{-1} \eta_a$ ;

4    | compute $\lambda_a = \frac{\eta_a^T M(\pi^{old}; \theta_0)^{-1}/d - 1}{\eta_a^T M(\pi^{old}; \theta_0)^{-1} \eta_a - 1}$;

5    | for a = 1, ..., k do
6    | | $\pi^{new}(a) = (1 - \lambda_a) \pi^{old}(a) + \lambda_a 1[a = \tilde{a}]$;
7    | end
8    | $\pi^{old} = \pi^{new}$
9    End

---

In some embodiments, the solver 526 stores algorithm 2 and executes algorithm 2 to determine (a) a respective maximum value for a number of exploit rounds for each of the one or more candidate recommendation systems and (b) a respective maximum value for a number of explore rounds for each of the one or more candidate recommendation systems. in step 3. In some embodiments, the solver 526 executes algorithm 2 to determine a respective potential randomized strategy based on a respective ratio for the number of exploit rounds and the number of explore rounds for each of the one or more candidate recommendation systems in step 4. In some embodiments, the solver 526 executes algorithm 2 to determine a respective randomized strategy for each of the one or more candidate recommendation systems based on a relationship between the respective potential randomized strategy and a previous respective randomized strategy in step 6.

In some embodiments, algorithm 2 solves equations 6 and 9. In some embodiments, the solver 526 can require O(d log log k+d/ϵ) updates to achieve a multiplicative (1+ϵ) optimal solution. Each update has an $O(kd^3)$ computation complexity, but is small (e.g. d=6 in Example 1). By treating the solver 526 as a subroutine, embodiments disclosed herein utilize the stage-wise exploration-exploitation with optimal design.

The solver 526 solves equation 6 by utilizing algorithm 3 as follows:

---
Algorithm 3: Stage-wise exploration-exploitation with optimal design.
---

Input: Reward model $f_\theta(\cdot)$; restart criteria; initialize history $\vec{h}_t$; optimal design solver; initialize $\theta$.
1 while total rounds ≤ n do
2 | if restart criteria is satisfied then
3 | | Reset $\vec{h}_t$;
| |
4 | End
5 | Compute the optimal exploration policy $\pi^*$ using the optimal design solver under $\theta_0 =$
| $\hat{\theta}$; Play $n_1$ rounds of exploration under $\pi^*$ and collect observation to $\vec{h}_t$;
6 | Optimize and update $\hat{\theta}$ based on $\vec{h}_t$;
7 | Play $n_2$ rounds of exploitation with:
8 End

--- instead of optimizing $\theta^-$ via the empirical-risk minimization, embodiments disclosed herein update the posterior of $\theta$ using the history data ht.

In some embodiments, in each exploitation round, the solver 526 executes algorithm 4 as follows:

---
Algorithm 4: Optional design for Thompson sampling at exploitation rounds.
---

1      Compute the posterior distribution $P_\theta$ according to the prior and collected data;
2      Sample $\hat{\theta}$ from $P_\theta$;
3      Select $a_t = \arg\max_a \hat{\theta}^T \phi(r_t, a(r_t))$;
4      Collect the observation to $h_t$;

---

Returning to FIG. 4, in many embodiments, method 400 can comprise an activity 450 of transmitting instructions to modify the graphical user interface to display the recommended products to the user. For example, the user 350 (FIG. 3) may input a search query into the web application 508 (FIG. 5) on the GUI 351 (FIG. 3). In some embodiments, the solver 526 (FIG. 5) can execute one or more of algorithms 1-4 to determine a number of recommended products to display to the user 350 (FIG. 3). In some embodiments, the system bandit service 506 (FIG. 5) transmits instructions to the algorithm service 512 (FIG. 5) modify the GUI 351 (FIG. 3) to display the recommended products to the user.

Turning to FIG. 5, the system architecture 500 can include a near line computation. For example, the system bandit service 506 can be a near line computation. In some embodiments, when the system bandit service 506 receives a user request (and the user requests relevant context), the system bandit service 506 can query the pre-computed reward, find the best recommendation system and output the recommendation systems content, or run the solver 526 using the pre-computed quantities and choose a recommendation system to explore. In some embodiments, the request distributor 510 maintains the resource availability and response time agreements to reduce computational stress during peak times. In some embodiments, scoring (model inference) for the candidate recommendation systems can be initiated in parallel to reduce the latency whenever there are spare resources. The pre-computations occur in the back-end training clusters, and their results (updated parameters, posterior of parameters, prior distributions) are stored in the mega cache 528 for the front end.

In some embodiments, the logging data 530 maintains storage of the past reward signals, contexts, policy value, etc. In some embodiments, the logging data 530 works interactively with a training cluster to run a scheduled job for pre-computation. In some embodiments, the rewards are often not immediately available, e.g. for the conversion rate. In some embodiments, the system bandit service 506 listens to the event streams and determines the rewards after each recommendation.

Returning to FIG. 3, in several embodiments, communication system 311 can at least partially perform activity 410 (FIG. 4).

In several embodiments, evaluation system 312 can at least partially perform activity 420 (FIG. 4).

In a number of embodiments, analysis system 313 can at least partially perform activity 430 (FIG. 4), and/or activity 440 (FIG. 4), and/or activity 450 (FIG. 4).

In a number of embodiments, web server 320 can at least partially perform method 400.

In many embodiments, the techniques described herein can provide a practical application and several technological improvements. In some embodiments, the techniques described herein can provide for the operation of candidate recommendation system analysis and coordinating the operation amongst different computing systems.

In many embodiments, the techniques described herein can be used continuously at a scale that cannot be reasonably performed using manual techniques or the human mind. For example, processing millions of queries within milliseconds cannot be feasibly completed by a human In a number of embodiments, the techniques described herein can solve a technical problem that arises only within the realm of computer networks, as product recommendations in a GUI do not exist outside the realm of computer networks.

In many embodiments, the techniques described herein can solve a technical problem in a related field that cannot be solved outside the context of computer networks. Specifically, the techniques described herein cannot be used outside the context of computer networks due to a lack of data and because the system bandit service cannot be performed without a computer system and/or network.

Although systems and methods for candidate recommendation systems analysis have been described with reference to specific embodiments, it will be understood by those skilled in the art that various changes may be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-5 may be modified, and that the foregoing discussion of certain of these embodiments does not necessarily represent a complete description of all possible embodiments. For example, one or more of the procedures, processes, or activities of FIG. 4 may include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that may cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A system comprising:
one or more processors; and
one or more non-transitory computer-readable media storing computing instructions that, when executed on the one or more processors, cause the one or more processors to perform:
receiving a user request that is input to a web application included in an online component via a graphical user interface, the user request corresponding to a user search query from a user for a product;
determining, by a request distributor, included in the online component whether a system bandit service is operating in a first processing mode or a second processing mode, wherein the request distributor maintains computing resource availability and response time agreements, wherein the system bandit service operates as middleware between the online component and an offline component, wherein the system bandit service comprises a first distributed system with a first queue, a second distributed system with a second queue, an explore module, and an exploit module, wherein the request distributor determines which of the first queue or the second queue is a shorter queue with more memory, and wherein when the request distributor determines that the first queue is the shorter queue, the request distributor transmits the user request to the first queue of the first distributed system;
transmitting the user request to: (1) the exploit module, via the second distributed system, when the first processing mode is a high processing mode and the second processing mode is a low processing mode, or (2) the explore module, via the first distributed system, when the first processing mode is the low processing mode and the second processing mode is the high processing mode;
using a process of a reward model that comprises stage-wise exploration and exploitation with an optimal design, wherein the optimal design leverages a D-optimal design to increase information gain during exploration compared to not using the D-optimal design, by determining a randomized strategy for a plurality of candidate recommendation systems based on a ratio of a number of the plurality of candidate recommendation systems, the randomized strategy to be stored in a collected history data;
when the system bandit service is determined to be operating in the low processing mode, analyzing the user request, via the offline component, using the plurality of candidate recommendation systems and generating respective predicted reward values and corresponding pre-computations associated with the reward model, to be stored in the collected history data;
when the system bandit service is determined to be operating in the high processing mode, determining, via the system bandit service, the candidate recommendation system from the plurality of candidate recommendation systems as a recommendation system with a maximum reward value for the reward model based on the user request and the collected history data;
processing, via the system bandit service, the user request with one or more of the recommendation system or the one or more candidate recommendation systems to identify recommended products to display to the user; and
transmitting instructions, from the system bandit service to an algorithm service included in the online component, to modify the graphical user interface to display the recommended products to the user and determining a reward value for the one or more of the recommendation system or the one or more candidate recommendation systems, to be stored in the collected history data.

2. The system of claim 1, wherein:
the first distributed system has the shorter queue than the second distributed system and the user request is transmitted to the first distributed system.

3. The system of claim 2, wherein:
the first processing mode is the low processing mode;
the second processing mode is the high processing mode consuming more computing resources than the low processing mode; and
the process comprises an explore process.

4. The system of claim 2, wherein:
the first processing mode is the high processing mode;
the second processing mode is the low processing mode consuming less computing resources than the high processing mode; and
the process comprises an exploit process.

5. The system of claim 1, wherein:
the first processing mode is the low processing mode;
the second processing mode is the high processing mode consuming more computing resources than the low processing mode; and
the process comprises an explore process.

6. The system of claim 1, wherein:
the first processing mode is the high processing mode;
the second processing mode is the low processing mode consuming less computing resources than the high processing mode; and
the process comprises an exploit process.

7. The system of claim 6, wherein the exploit process further comprises resetting the collected history data collected prior to determining the randomized strategy.

8. The system of claim 1, wherein determining the randomized strategy further comprises:
- determining (a) a respective maximum value for a number of exploit rounds for each of the one or more candidate recommendation systems and (b) a respective maximum value for a number of explore rounds for each of the one or more candidate recommendation systems;
- determining a respective potential randomized strategy based on a respective ratio for the number of exploit rounds and the number of explore rounds for each of the one or more candidate recommendation systems; and
- determining a respective randomized strategy for each of the one or more candidate recommendation systems based on a relationship between the respective potential randomized strategy and a previous respective randomized strategy.

9. The system of claim 1, further comprising:
- determining model parameters included in the corresponding pre-computations associated with the reward model based on the collected history data comprising performing empirical-risk minimization.

10. A method implemented via execution of computing instructions configured to run at one or more processors and configured to be stored at non-transitory computer-readable media, the method comprising:
- receiving a user request that is input to a web application included in an online component via a graphical user interface, the user request corresponding to a user search query from a user for a product;
- determining, by a request distributor, included in the online component whether a system bandit service is operating in a first processing mode or a second processing mode, wherein the request distributor maintains computing resource availability and response time agreements, wherein the system bandit service operates as middleware between the online component and an offline component, wherein the system bandit service comprises a first distributed system with a first queue, a second distributed system with a second queue, an explore module, and an exploit module, wherein the request distributor determines which of the first queue or the second queue is a shorter queue with more memory, and wherein when the request distributor determines that the first queue is the shorter queue, the request distributor transmits the user request to the first queue of the first distributed system;
- transmitting the user request to: (1) the exploit module, via the second distributed system, when the first processing mode is a high processing mode and the second processing mode is a low processing mode, or (2) the explore module, via the first distributed system, when the first processing mode is the low processing mode and the second processing mode is the high processing mode;
- using a process of a reward model that comprises stage-wise exploration and exploitation with an optimal design, wherein the optimal design leverages a D-optimal design to increase information gain during exploration compared to not using the D-optimal design, by determining a randomized strategy for a plurality of candidate recommendation systems based on a ratio of a number of the plurality of candidate recommendation systems, the randomized strategy to be stored in a collected history data;
- when the system bandit service is determined to be operating in the low processing mode, analyzing the user request, via the offline component, using the plurality of candidate recommendation systems and generating respective predicted reward values and corresponding pre-computations associated with the reward model, to be stored in the collected history data;
- when the system bandit service is determined to be operating in the high processing mode, determining, via the system bandit service, the candidate recommendation system from the plurality of candidate recommendation systems as a recommendation system with a maximum reward value for the reward model based on the user request and the collected history data;
- processing, via the system bandit service, the user request with one or more of the recommendation system or the one or more candidate recommendation systems to identify recommended products to display to the user; and
- transmitting instructions, from the system bandit service to an algorithm service included in the online component, to modify the graphical user interface to display the recommended products to the user and determining a reward value for the one or more of the recommendation system or the one or more candidate recommendation systems, to be stored in the collected history data.

11. The method of claim 10, wherein:
the first distributed system has the shorter queue than the second distributed system and the user request is transmitted to the first distributed system.

12. The method of claim 11, wherein:
the first processing mode is the low processing mode;
the second processing mode is the high processing mode consuming more computing resources than the low processing mode; and
the process comprises an explore process.

13. The method of claim 11, wherein:
the first processing mode is the high processing mode;
the second processing mode is the low processing mode consuming less computing resources than the high processing mode; and
the process comprises an exploit process.

14. The method of claim 10, wherein:
the first processing mode is the low processing mode;
the second processing mode is the high processing mode consuming more computing resources than the low processing mode; and
the process comprises an explore process.

15. The method of claim 10, wherein:
the first processing mode is the high processing mode;
the second processing mode is the low processing mode consuming less computing resources than the high processing mode; and
the process comprises an exploit process.

16. The method of claim 15, wherein the exploit process further comprises resetting the collected history data collected prior to determining the randomized strategy.

17. The method of claim 10, wherein determining the randomized strategy further comprises:
- determining (a) a respective maximum value for a number of exploit rounds for each of the one or more candidate recommendation systems and (b) a respective maximum value for a number of explore rounds for each of the one or more candidate recommendation systems;

determining a respective potential randomized strategy based on a respective ratio for the number of exploit rounds and the number of explore rounds for each of the one or more candidate recommendation systems; and determining a respective randomized strategy for each of the one or more candidate recommendation systems based on a relationship between the respective potential randomized strategy and a previous respective randomized strategy.

18. The method of claim 10, further comprising:

determining model parameters included in the corresponding pre-computations associated with the reward model based on the collected history data comprising performing empirical-risk minimization.

19. A non-transitory computer-readable medium storing instructions, the instructions, upon execution by one or more processors of a computing system, cause the computing system to perform one or more processes including:

receiving a user request that is input to a web application included in an online component via a graphical user interface, the user request corresponding to a user search query from a user for a product;

determining, by a request distributor, included in the online component whether a system bandit service is operating in a first processing mode or a second processing mode, wherein the request distributor maintains computing resource availability and response time agreements, wherein the system bandit service operates as middleware between the online component and an offline component, wherein the system bandit service comprises a first distributed system with a first queue, a second distributed system with a second queue, an explore module, and an exploit module, wherein the request distributor determines which of the first queue or the second queue is a shorter queue with more memory, and wherein when the request distributor determines that the first queue is the shorter queue, the request distributor transmits the user request to the first queue of the first distributed system;

transmitting the user request to: (1) the exploit module, via the second distributed system, when the first processing mode is a high processing mode and the second processing mode is a low processing mode, or (2) the explore module, via the first distributed system, when the first processing mode is the low processing mode and the second processing mode is the high processing mode;

using a process of a reward model that comprises stage-wise exploration and exploitation with an optimal design, wherein the optimal design leverages a D-optimal design to increase information gain during exploration compared to not using the D-optimal design, by determining a randomized strategy for a plurality of candidate recommendation systems based on a ratio of a number of the plurality of candidate recommendation systems, the randomized strategy to be stored in a collected history data;

when the system bandit service is determined to be operating in the low processing mode, analyzing the user request, via the offline component, using the plurality of candidate recommendation systems and generating respective predicted reward values and corresponding pre-computations associated with the reward model, to be stored in the collected history data;

when the system bandit service is determined to be operating in the high processing mode, determining, via the system bandit service, the candidate recommendation system from the plurality of candidate recommendation systems as a recommendation system with a maximum reward value for the reward model based on the user request and the collected history data;

processing, via the system bandit service, the user request with one or more of the recommendation system or the one or more candidate recommendation systems to identify recommended products to display to the user; and transmitting instructions, from the system bandit service to an algorithm service included in the online component, to modify the graphical user interface to display the recommended products to the user and determining a reward value for the one or more of the recommendation system or the one or more candidate recommendation systems, to be stored in the collected history data.

20. The non-transitory computer-readable medium storing instructions of claim 19, wherein when the first processing mode is the low processing mode and the second processing mode is the high processing mode that consumes more computing resources than the low processing mode, the process comprises an explore process, and wherein when the first processing mode is the high processing mode and the second processing mode is the low processing mode, the process comprises an exploit process.

* * * * *